A. W. H. LENDERS.
STEEPING APPARATUS.
APPLICATION FILED JUNE 20, 1908.
925,583.
Patented June 22, 1909.
2 SHEETS—SHEET 2.
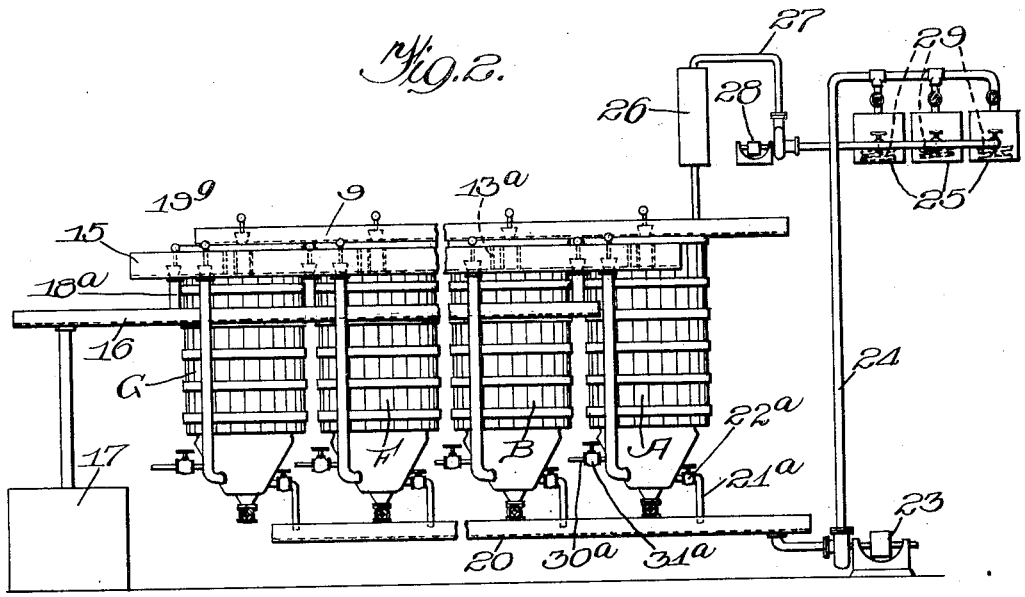
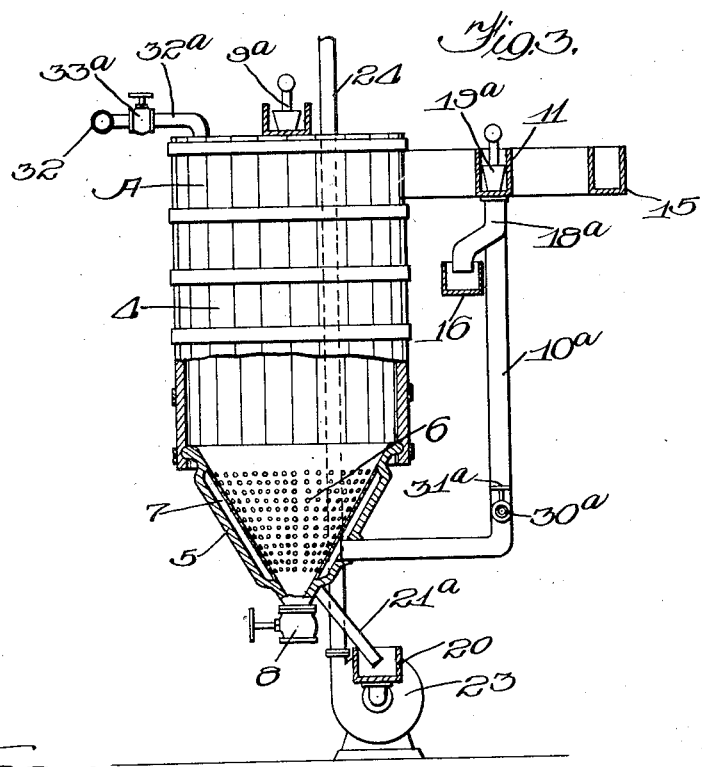

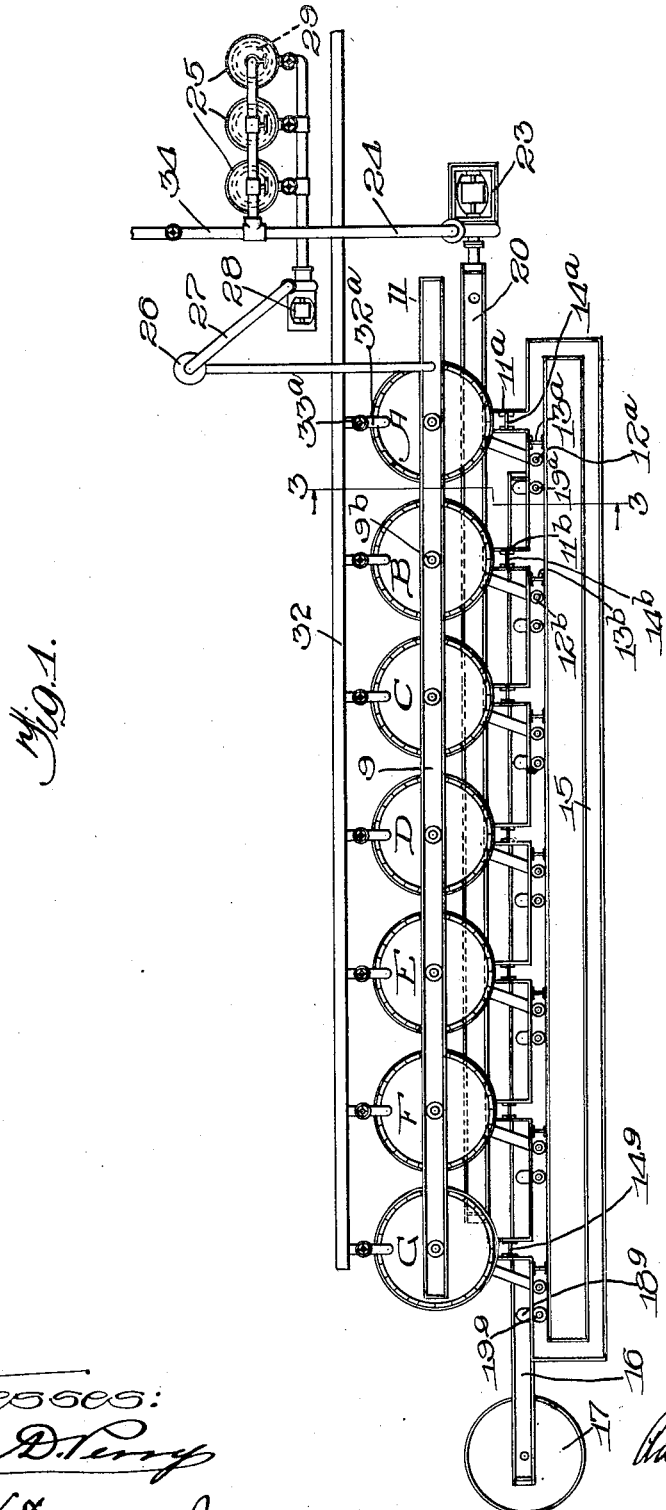

UNITED STATES PATENT OFFICE.

ADOLPH W. H. LENDERS, OF WAUKEGAN, ILLINOIS.

STEEPING APPARATUS.

No. 925,583.

Specification of Letters Patent.

Patented June 22, 1909.

Application filed June 20, 1908. Serial No. 439,548.

*To all whom it may concern:*

Be it known that I, ADOLPH W. H. LENDERS, a citizen of the United States, residing at Waukegan, in the county of Lake and State of Illinois, have invented certain new and useful Improvements in Steeping Apparatus, of which the following is a specification.

My invention relates to steeping apparatus and has for its object to provide apparatus for the steeping of corn or other material by means of which large quantities of material may be effectively and uniformly steeped, softened and washed, whereby a maximum amount of the soluble substances contained in said material may be dissolved out and saved, and whereby successive lots of material may be handled without interrupting the continuity of the operation.

The apparatus is of particular utility as an improvement upon the present process of making starch from corn and upon the apparatus ordinarily employed for steeping the grain before it is milled, and the apparatus is especially designed for carrying out an improvement in the process of steeping corn in the making of starch which has been invented by me and has been made the subject of a co-pending application Serial No. 439,549. The apparatus might, however, be used in other connections and upon other sorts of material besides corn.

As is well known, it is usual in the making of starch from corn to soften the corn, before breaking it up or grinding it, by steeping it in steeping tanks with a very dilute sulfurous acid. In a factory of any considerable size it is necessary to have a large number of these steeping tanks. Ordinarily the corn and the steep water are kept together in the tanks for from twenty-five to fifty hours, the water being frequently kept agitated or in circulation in the tanks by means of propellers or by steam jets. When the corn is sufficiently softened, the steep water is drawn off and, in some cases, is evaporated so as to reclaim the soluble substances dissolved out of the corn, which are useful as feed products. The corn is then usually washed, which reduces its acidity and removes more of the soluble substances which it contains. This method of steeping the corn in separate, disconnected steeps results, in spite of all the care that can be taken, in lack of uniformity in the yield. The corn from some of the steeps, due to varying conditions in temperature, circulation and acidity of the steep water, is harder or softer than the corn coming from other tanks. It even happens that where large steeps are employed the corn from part of the steep is less thoroughly softened than that from other parts of the same steep. This lack of uniformity is obviously objectionable when the corn reaches the milling step. Moreover, this treatment of the grain in single steeps is not calculated to dissolve out all or even a very large quantity of the soluble substances in the corn. Those that are not dissolved out go through the following steps of the process and finally go to waste with the waste water from the starch and gluten tanks. Furthermore, in order to obtain a pure yield of starch, it is necessary to wash out these substances, which increases the amount of washing which the starch has to go through during the later stages of the process.

The object of my present invention is to provide a new and improved apparatus for steeping the corn which will soften and wash the corn uniformly, dissolve out a maximum amount of the soluble matters during the steeping process, so that they may be inexpensively saved, and by which the steeping process may be made regular and continuous. In this way I make the process of starch manufacture more simple and economical, obtain a purer and better grade of starch and get a very much increased yield of feed materials as a by-product.

A preferred embodiment of my invention is illustrated in the accompanying drawings, wherein—

Figure 1 represents a plan view of a battery of steeping tanks arranged and connected together in accordance with my invention. Fig. 2 is a side elevation of the same, the middle tanks being broken out; and Fig. 3 is a sectional view on the line 3—3 of Fig. 1, looking in the direction of the arrows, one tank being shown in elevation but with parts in section to illustrate its interior construction.

Like characters of reference indicate like parts in the several figures of the drawings.

A, B, C, D, E, F and G represent a series of steep tanks of any preferred construction. These tanks may be all alike. The construction of tank A is shown in Fig. 3. The tank consists of a wooden vat 4 which surmounts a cone-shaped casting 5, in which is a cone-shaped sieve 6, the sides of the casting being offset to leave a recess 7 between the casting and the sieve. The cone bottom terminates in a valve casing 8, in which is a valve to control the discharge of the corn from the tank. Above the tanks is a common supply trough 9 having an opening in the bottom leading into tank A, controlled by a plug valve $9^a$, and corresponding openings leading to the other tanks. From the cone bottom 5 a pipe $10^a$ leads to a common connecting trough 11, which has a branch trough $11^a$ leading to tank A and corresponding branches to the other tanks, the opening of pipe $10^a$ into trough 11 being controlled by plug valve $12^a$. Forward of this opening in the trough 11 is a slide gate $13^a$ of ordinary construction, the branch trough being provided with a similar gate $14^a$. A return trough 15 connects the ends of trough 11. Below trough 11 is a common receiving trough 16, which leads to evaporating apparatus conventionally shown at 17. A pipe $18^a$ leads from trough 11 at a point adjacent tank A into trough 16, the opening into this pipe being controlled by a plug $19^a$. Corresponding pipes lead from the trough 11 into trough 15 from points adjacent the other tanks. Below the tanks is a draining trough 20, into which leads from tank A a pipe $21^a$ provided with a valve $22^a$ by means of which pipe, and of similar pipes from the other tanks, the tanks may be drained into trough 20. This trough leads to pump 23, whence the liquid is forced through pipe 24 into storage vessels 25. 26 represents conventionally a sulfur tower or other apparatus for replenishing the acid water in the storage tanks with $SO_2$. The liquid from the storage tanks is forced through pipe 27 to the sulfur tower by pump 28. The storage tanks are preferably provided with steam coils 29. The temperature may be kept up in the tanks also by injecting steam directly into the tanks or the connections between the same. I have shown a steam pipe $30^a$ having a valve $31^a$, which pipe leads into the circulation pipe $10^a$. I preferably provide means for conducting fresh water to the tanks.

32 is a water pipe having branches, one of which $32^a$ leads to tank A and is provided with a valve $33^a$. Pipe 34 which may be provided with a valve as shown supplies the storage vessels with water.

The operation of this apparatus is as follows: Supposing the steeping operation to be begun with the tanks empty, tank A will be filled with corn and acid water, let us suppose with 2000 bushels of corn and 12000 gallons of acid water. Tanks B, C, D, E, F and G will be successively charged with corn and, by the addition of acid water to trough 9, the acid water in tank A will be forced up through pipe $10^a$ into trough 11 and, in its back flow being prevented by gate $13^a$, it will flow through branch trough $11^b$ into tank B, and so on throughout the tanks, thus gradually becoming denser with the soluble substances dissolved out of the corn, until it is discharged from the last tank of the series in operation, let us say from tank G. From this tank it passes into trough 11 as before but, plug $19^g$ at the opening of pipe $18^g$ having been removed, the other outlets from trough 11 adjacent the other tanks being, of course, closed, the saturated steep water will flow down into trough 16 and thence to the evaporating apparatus 17, where the solid material may be dried out or sufficiently dried so that the residue may be run to the feed dry-house and dried to a commercial moisture with the feed products from the other steps of the starch process. When the corn in tank A has been sufficiently steeped, and this corn it will be seen is being continually treated with fresh acid water, the tank may be cut out of the circulatory system of the battery by closing the opening into the tank by its plug valve $9^a$. The plug $9^b$ of tank B will now be removed, gate $13^a$ opened, plug $12^a$ replaced, and plug $12^b$ removed from pipe $10^b$. The acid water will now flow from trough 9 into tank B, through tank B into trough 11, and so on through the remaining tanks of the battery. Tank A is cut out. By opening valve $22^a$ the acid water is allowed to drain into trough 16, whence it is pumped into the storage tanks by pump 23. After having drained the corn in tank A, it is preferably washed by the application of fresh water from pipe $32^a$. This water will also drain into tank 16 and be pumped into the storage tanks. From the storage tanks it will go to the sulfur tower 26, where the requisite amount of $SO_2$ will be added. The particular construction of the means for replenishing the acid water in itself forms no part of my invention. Any well known kind of apparatus could be used. After the corn in tank A has drained, it may be drawn off into cars or conveyers by opening the valve in casing 8. The tank will then, in the ordinary operation of the apparatus, be refilled with fresh corn and connected with the circulatory system through the battery, so as to receive the oldest steep water, that is, the steep water after it has come from all the other steep tanks. It will be supposed now that the grain in tank B has been sufficiently steeped and that this tank is cut out of the battery in the manner above described. The fresh steep water is now entering the battery at tank C and flowing through the remaining tanks. Plug $19^c$ will be replaced. The steep water coming from tank G will flow around through the return trough 15 and into tank A, which is now the last tank of the series, slide gate 14ª being raised to admit the steep water to the tank. Plug 19ª will be removed, so that the steep water from tank A will flow out of trough 11 into trough 16 and thence to the evaporating apparatus as before. Preferably there are always three adjacent tanks cut out at a time, the tanks being, of course, cut out successively, in one of which the grain is draining, in the next being washed and the third tank being at the same time emptied and refilled.

It will be seen that the grain longest in the steep is being continually acted upon by fresh acid water, while the old acid water is continually being brought into contact with fresh corn. Thus the acid water is used most effectively. The operation of the apparatus is perfectly regular and continuous. The softening of the grain is necessarily uniform throughout the steeps. The liquid coming from the last of the steeps is heavily saturated with the soluble substances of the corn and may be easily evaporated at no great cost.

I have found by experience that the use of this apparatus practically doubles the yield of soluble substances.

I do not limit myself to the exact arrangements, devices and constructions herein shown, as obvious modifications will occur to those skilled in the art. The circulatory system which I have shown is largely a gravity system. It is obvious that instead of forcing the steep water through the tanks by gravity, it might be pumped from tank to tank, although, perhaps, not so efficiently in some respects. The arrangement of the tanks is not material. I have shown and prefer to use troughs for connecting the tanks with the source of supply, with each other and with the evaporating device, these troughs, together with the branch troughs and connecting pipes, forming a circulatory system through the battery which permits the relative position of the tanks in respect to the circulation to be varied and which permits any of the tanks to be cut out of operation without affecting the circulation through the remaining tanks. It is obvious that pipes or other conduits might be employed instead of the troughs shown.

I have described the operation of the battery as providing for the cutting of the tanks out of the circulatory system singly. It is obvious that the tanks could be operated in pairs or three at a time, if desired.

It is obvious that, if desired, the water for washing the corn could be circulated several times through the tanks before being carried away to the pump by trough 20.

I claim:

1. In apparatus for steeping grain in the making of starch, combination with a plurality of steep tanks, of means for introducing a steeping liquid into one of said tanks, a circulatory system connecting the tanks together whereby the steeping liquid is circulated through other of the tanks, and means for cutting the tanks out of the circulatory system singly without interfering with the circulation through the other tanks.

2. In apparatus for steeping grain in the making of starch, combination with a plurality of steep tanks, of means for introducing a steeping liquid into any one of said tanks, a common connecting conduit, means for connecting the tanks separately with the same, and means for closing communication between the tanks separately and the conduit without preventing the continuous circulation through the other tanks.

3. In apparatus for steeping grain in the making of starch, combination with a plurality of steep tanks, of means for introducing steeping liquid into any one of said tanks, a common connecting conduit, means for connecting the tanks separately with the same, means for closing communication between the several tanks and connecting conduit without preventing the continuous circulation through the other tanks, receiving means, and separately controlled discharge pipes leading from the connecting conduit to the receiving means.

4. In apparatus for steeping grain in the making of starch, combination with a plurality of steep tanks, of means for introducing a steeping liquid into any one of said tanks, a common connecting conduit, a return conduit for returning the steep water from one end of the connecting conduit to the other, means for connecting the tanks separately with the connecting conduit, and means for closing communication between the several tanks and the connecting conduit without interfering with the continuous circulation through the other tanks.

5. In apparatus for steeping grain in the making of starch, combination with a plurality of steep tanks, of means for introducing a steeping liquid into any one of said tanks, a circulatory system connecting the tanks together, whereby the steeping liquid is circulated through other of the tanks, means for cutting the tanks out of the circulatory system singly without interfering with the circulation through the other tanks, and a common drain independent of said circulatory system with which the several tanks are adapted to be connected.

6. In apparatus for steeping grain in the making of starch, combination with a plurality of steep tanks, of means for introducing a steeping liquid into any one of said tanks, a circulatory system connecting the tanks together, whereby the steeping liquid is circulated through other of the tanks, means for cutting the tanks out of the circulatory system singly without interfering with the circulation through the other tanks, a common drain independent of said circulatory system with which the several tanks are adapted to be connected, and means for returning the liquid from the drain to said circulatory system.

7. In apparatus for steeping grain in the making of starch, combination with a plurality of steep tanks, of means for introducing a steeping liquid into any one of said tanks, a circulatory system connecting the tanks together, whereby the steeping liquid is circulated through other of the tanks, means for cutting the tanks out of the circulatory system singly without interfering with the circulation through the other tanks, a common drain conduit independent of said circulatory system with which the several tanks are adapted to be connected, means for returning the liquid from the drain to said circulatory system, and means for replenishing said liquid with acid.

8. In apparatus for steeping grain in the making of starch, combination with a plurality of steep tanks arranged on the same level, of a source of supply of steeping liquid arranged above the steep tanks, a circulatory system connecting the tanks together, whereby the steeping liquid is circulated by gravity through the tanks in series, and means for cutting the tanks out of the circulatory system singly without interfering with the circulation through the other tanks each of said tanks being provided with a grain outlet, whereby the steeped grain may be removed from the tanks when they are cut out of the circulatory system.

9. In apparatus for steeping grain in the making of starch, combination with a plurality of steep tanks, of means for introducing a steeping liquid into any one of said tanks, a circulatory system connecting the tanks together, whereby the steeping liquid is circulated through other of the tanks, means for cutting the tanks out of the circulatory system singly without interfering with the circulation through the other tanks, and means independent of said circulatory system for supplying a washing liquid to the several tanks after they are cut out of the circulatory system.

10. In apparatus for steeping grain in the making of starch, combination with a plurality of steep tanks, of a common supply conduit having valve-controlled connections with each of said tanks, a connecting conduit, branch conduits leading to and from the connecting conduit into each of the tanks, means for closing said branch conduits, means for closing the connecting conduit between the branch conduits, and separate, valve-controlled discharge devices leading from the connecting conduit adjacent the branch conduits from the several tanks.

11. In apparatus for steeping grain in the making of starch, combination with a plurality of tanks, of a common supply conduit having valve-controlled connections with each of the tanks, a common connecting conduit, branch conduits leading to and from the connecting conduit and each of the tanks, means for closing said branch conduits, means for closing the connecting conduit between the branch conduits, common receiving means, and separate, valve-controlled discharge devices leading from the connecting conduit to said receiving means.

12. In apparatus for steeping grain in the making of starch, combination with a plurality of tanks, of a common supply conduit having valve-controlled connections with each of said tanks, a common connecting tank, branch conduits connecting each of the tanks at top and bottom with the connecting conduit, and means for closing the connecting conduit between the branch conduits leading to the several tanks.

13. In apparatus for steeping grain in the making of starch, the combination with a plurality of steep tanks, of a circulatory system of conduits associated with the steep tanks, whereby a steeping liquid is conducted through said tanks in series, means whereby the order of succession of the flow through the tanks may be changed, and means for cutting certain of the tanks out of said circulatory system without preventing the circulation through the remaining tanks.

14. In apparatus for steeping grain in the making of starch, the combination of a plurality of steeping tanks, a common supply conduit adapted to be put into communication with any of the said tanks at will; a common connecting conduit, a valved connection between the same and each of the tanks whereby a continuous circulatory system may be formed which will include any desired number of said tanks; a discharge device adapted to be connected with said circulatory system at different points so as to receive the discharge from any of said tanks at will.

15. In apparatus for steeping grain in the manufacture of starch, the combination of a plurality of steep tanks, a common supply tank adapted to be put into communication with any of the said tanks at will; a common connecting conduit, a valved connection between the same and each of the tanks whereby a continuous circulatory system may be formed which will include any number of said tanks; a common discharge conduit and means for opening communication between any of the tanks at will, and said discharge conduit.

16. In apparatus for steeping grain in the manufacture of starch, the combination of a plurality of steep tanks, a common supply conduit adapted to be put into communication with any of said tanks at will; a common connecting conduit and valved connections between the same and each of the tanks whereby a continuous circulatory system may be formed which will include any number of said tanks; an evaporating device and means whereby the same may be connected with any of said tanks, so as to receive the discharge therefrom.

17. In apparatus for steeping grain in the manufacture of starch, the combination of a plurality of steep tanks, a common supply conduit adapted to be put into communication with any of said tanks at will; a common connecting conduit and valved connection between the same in each of the tanks whereby a continuous circulatory system may be formed which will include any number of said tanks; a common discharge conduit located below the connecting conduit and valve controlled connecting pipes between the connecting conduit and the discharge conduit located at different points so as to provide for the discharge from the several tanks.

18. In apparatus for steeping grain in the manufacture of starch, the combination of a plurality of steep tanks; a common supply conduit adapted to be put into communication with any of said tanks at will; a common connecting conduit and valved connections between the same and each of the tanks whereby a continuous circulatory system may be formed which will include any number of said tanks; a discharge device adapted to be connected with said circulatory system at different points; a common drain and means for returning the liquid received in the drain to said circulatory system.

19. In apparatus for steeping grain in the manufacture of starch, the combination of a plurality of steep tanks; a common supply conduit adapted to be put into communication with any of said tanks at will; a common connecting conduit and valved connection between the same and each of the tanks whereby a continuous circulatory system may be formed which will include any number of said tanks; a discharge device adapted to be connected with said circulatory system at different points; a common drain and means for returning the liquid received in the drain to said circulatory system and means for supplying the tanks separately with water.

20. In apparatus for steeping grain in the manufacture of starch, the combination of a plurality of steep tanks; a common supply conduit adapted to be put into communication with any of said tanks at will; a common connecting conduit and valved connections between said conduit and the top and bottom of each of said tanks whereby a continuous circulatory system may be formed which will include any number of said tanks; and a discharge device adapted to be connected with said circulatory system at different points.

21. In apparatus for steeping grain in the manufacture of starch, the combination of a plurality of steep tanks; a common connecting conduit and valved connection between the same and each of said tanks whereby a continuous circulatory system may be formed which will include any desired number of said tanks; a source of supply of water, a common supply conduit leading from said source of supply to the several tanks, an acid charging device interposed in said conduit; an evaporating device and means for connecting said circulatory system at different points with said evaporator so that it continuously receives the discharge from the same.

22. In apparatus for steeping grain in the manufacture of starch, the combination of a plurality of steep tanks; a common connecting conduit and valved connections between the same and each of said tanks whereby a continuous circulatory system may be formed which will include any desired number of said tanks; a source of supply of water, a common supply conduit leading from said source of supply to the several tanks, an acid charging device interposed in said conduit; an evaporating device and means for connecting said circulatory system at different points with said evaporator so that it continuously receives discharge from the same, means for supplying fresh water to the several tanks separately; a common drain for the tanks and means for returning the liquid in the drain to said source of supply.

23. A steeping apparatus comprising a plurality of steep tanks, each provided with a grain outlet and a liquid outlet at the bottom, a common supply conduit arranged over said tanks with valved connections leading into the same; a common connecting conduit with valved connections leading to and from the top and bottom of each of said tanks; a common discharge conduit below the connecting conduit and valved connections between the same at different points; and a common drain into which the liquid outlets from the bottom of the several tanks discharge.

24. In apparatus for steeping grain in the manufacture of starch, the combination of a plurality of steep tanks, each provided at the bottom with a valve controlled grain outlet; a common connecting conduit and valved connections between same and each of said tanks whereby a continuous circulatory system may be formed which will include any desired number of said tanks; a source of supply of acid water, a common conduit leading from the said source of supply to the several tanks, an evaporator and a common discharge conduit having valved connections with said circulatory system at several points and leading to the evaporator.

ADOLPH W. H. LENDERS.

Witnesses:
P. H. TRUMAN,
H. L. PECK.